Patented Feb. 10, 1931

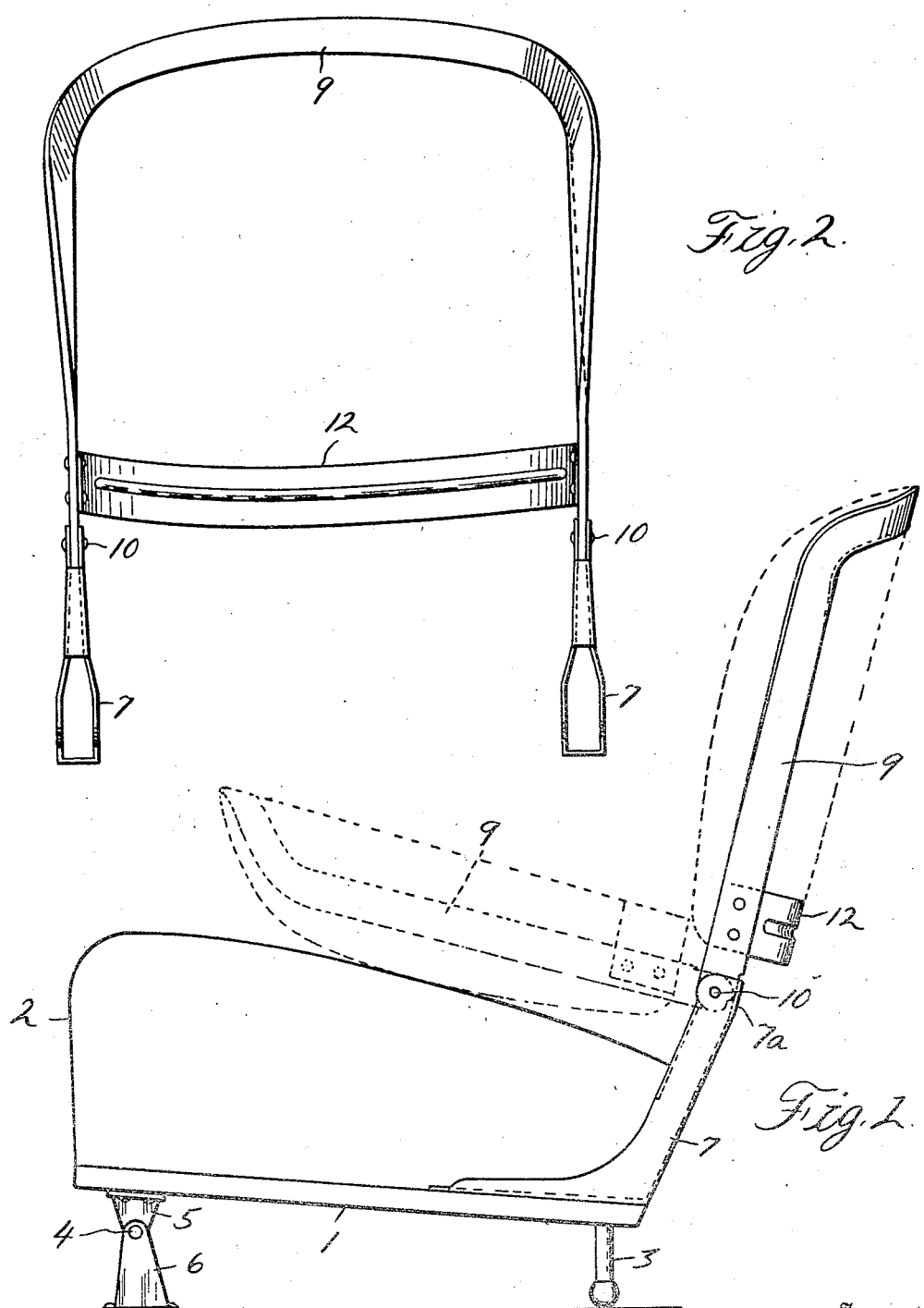

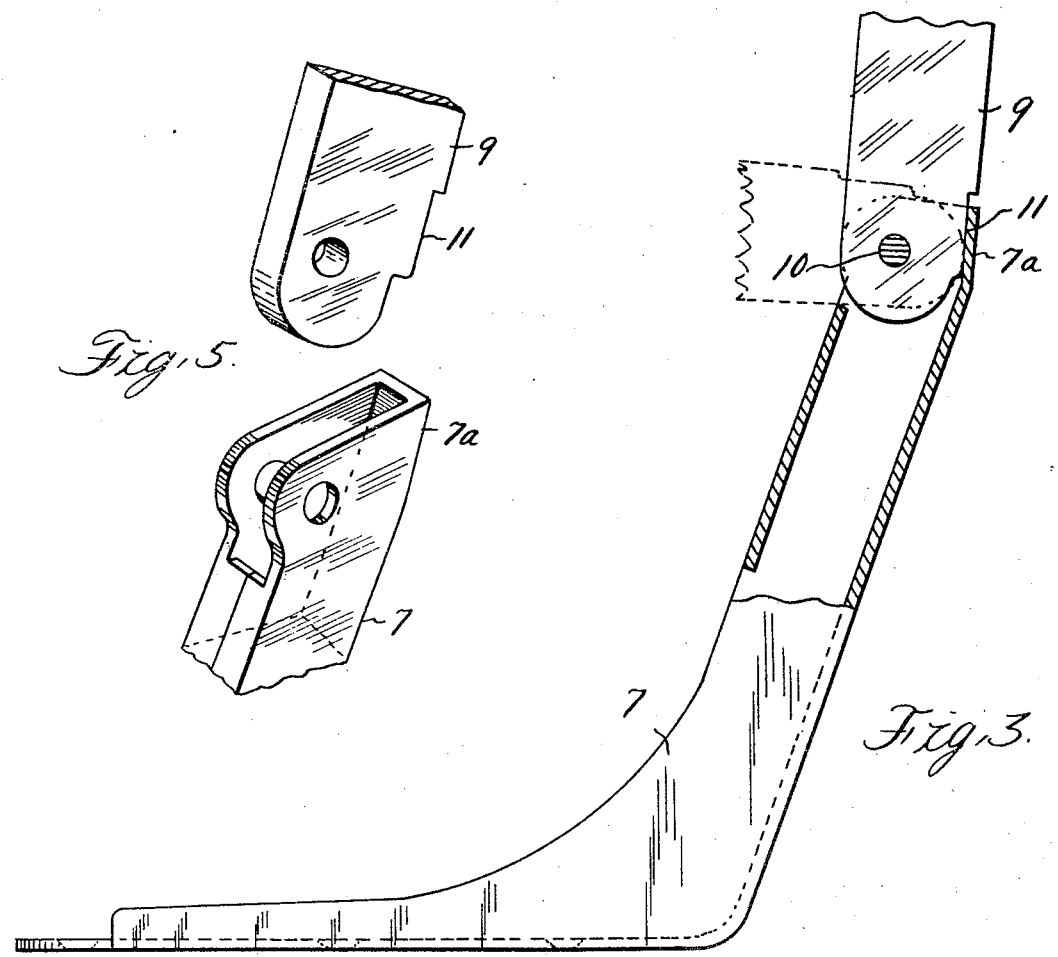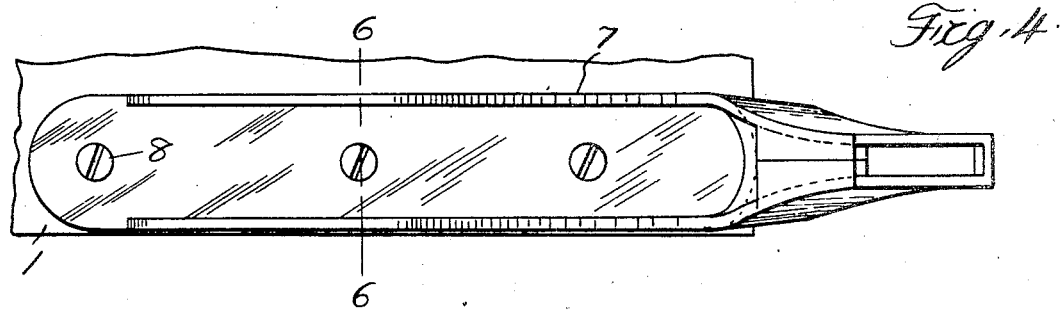

1,791,765

UNITED STATES PATENT OFFICE

WALTER S. SAUNDERS AND ROBERT MARTINDELL, OF PONTIAC, MICHIGAN, ASSIGNORS TO AMERICAN FORGING & SOCKET COMPANY, OF PONTIAC, MICHIGAN

SEAT-BACK SUPPORT

Application filed October 27, 1927. Serial No. 229,043.

This invention relates to vehicle seats and particularly to vehicle seats having tilting backs such as are commonly used in certain types of motor vehicles to afford more space for movement of the vehicle occupants.

An object of the invention is to very securely mount upon the base of a vehicle seat a pair of bracket members and to pivotally engage said member by a substantially U-shaped back support for the seat.

Another object is to pivot the back support of a vehicle seat upon members carried by the seat base and to form said members with strong abutments engageable by the pivotal ends of said back support in its position of use so as to take care of the heavy rearward thrust at times acting upon said back support without undue resulting wear.

These and various other objects the invention attains by the construction hereinafter described and illustrated in the accompanying drawings, wherein:—

Figure 1 is a view in side elevation of the vehicle seat equipped with a tilting back in accordance with this invention.

Figure 2 is a front view of the back disassembled from the base.

Figure 3 is an enlarged elevational view in partial section of a bracket member attachable to a seat base for pivotally mounting a back support.

Figure 4 is a plan view of the same.

Figure 5 is a fragmentary perspective view of the pivotally connectible ends of said bracket member and the back support.

Figure 6 is a cross sectional view taken upon the line 6—6 of Figure 4.

In these views the reference character 1 designates the base of a vehicle seat, 2 the upholstery of said base, 3 a supporting leg attached to and depending from the rear portion of said base and 4 a pivot connection established between brackets 5 and 6, the former depending from the front portion of said base and the latter secured to the floor of a vehicle, whereby the base is adapted to tilt forwardly as is known in the art.

Upon the rear portion of the base 1 a pair of upstanding angular brackets 7, preferably of sheet metal, is mounted, one at each side thereof, their lower portions being rigidly secured to the base 1, as by screws 8, and the upper portions of said brackets being preferably folded into substantially tubular form and inclined slightly to the rear as they project upwardly. 9 designates a U-shaped back support formed preferably of sheet metal and having its lower extremities pivoted as indicated at 10 upon the brackets 7 whereby the support 9 is adapted to swing from the raised position of use shown in full lines in Figure 1, to the collapsed position shown in dash lines in said figure. As best seen in Figures 3, 4 and 5, the lower ends of the back support 9 are adapted to fit into the upper ends of the brackets 7 and the front walls of the upper portion of each of said brackets is cut away to permit the back support to swing to its substantially horizontal collapsed position. Preferably the rear wall of the topmost portion of each bracket 7 is obtusely inclined to the lower portion of said wall, substantially as indicated at 7a, so as to be approximately vertical. The portions 7a of the two brackets form abutments the inner vertical faces of which are engageable by the rear edges of the ends of the support 9, said ends being suitably shaped to provide bearing faces 11 to seat against the portions 7a when the back support 9 is in its full raised position. The extent of the engaged faces 11 and 7a is fully adequate to transmit to the brackets 7 such rearward strains as are placed upon the back support 9 without undue wear of either of said faces or bending of either part. The avoidance of such wear or bending is vitally important in constructions of the described character since only a slight yielding between the back support and its supporting brackets is sufficient to permit an undue inclination of said support, such as will detract from the comfort of the occupant of the seat.

It is to be noted that there is no engagement between the horizontal top edge of the bracket 7 and the seat back support 9. Such engagement has been found to bend downwardly the top of the bracket by a crumpling or tearing action, unless the sheet metal of the bracket is made of much heavier gauge metal than would be necessary for the economic production of the remainder of the bracket. Our vertical line to line contact between the seat back support and bracket obviates this objectionable feature and distributes the strains imposed on the bracket over a comparatively great area. Preferably a brace member 12 is employed to rigidly connect and reinforce the lower end portions of the back support 9 as best appears in Figures 1 and 2.

The described construction is simple and comparatively inexpensive and adds very materially to the strength of pivot-back seats as compared with the practice now followed.

While it will be apparent that the illustrated embodiments of our invention herein disclosed are well calculated to adequately fulfill the objects and advantages primarily stated, it is to be understood that the invention is susceptible to variation, modification, and change within the spirit and scope of the subjoined claims.

What we claim is:

1. A seat-mounting bracket comprising a sheet metal stamping having a forwardly projecting securing portion and a tubular upstanding securing portion, the securing portion having upturned walls at each side thereof which are continuous with the side walls of the tubular supporting portion, the side walls converging toward the top of the bracket, and inbent abutting portions adjacent the top of the bracket forming the front wall of the tubular supporting portion.

2. A combination with a stamped sheet metal bracket comprising a securing base and an upstanding tubular portion having inturned portions abutting to form its front wall and having its side walls and rear wall extended above its front wall, of an arm pivoted between the side walls of said tubular portion above the front wall thereof, the rear wall of said bracket providing an upright abutment for said arm in a raised position of the arm and the top edge of the front wall providing a seat for said arm in a lowered forwardly projecting position thereof.

3. In combination, a sheet metal bracket comprising a securing base and an upstanding tubular portion inclined rearwardly from the base and formed with the upper portion of its rear wall bent forwardly at an angle to such inclined portion, inturned abutting portions forming the front wall of the tubular portion and terminating below said upper portion of the rear wall, and an arm pivoted between the side walls of said tubular portion above the front wall thereof in position whereby the rear wall of the arm will substantially vertically engage said upper portion of the rear wall of the bracket when the arm is in raised position and the top edge of the front wall of the bracket will provide a seat for said arm when in lowered position.

In witness whereof we hereunto set our hands.

WALTER S. SAUNDERS.
ROBERT MARTINDELL.